3,672,836
TREATMENT OF AN AQUEOUS STREAM CONTAINING WATER-SOLUBLE INORGANIC SULFIDE COMPOUNDS
Kenneth M. Brown, Arlington Heights, Ill., assignor to Universal Oil Products Company, Des Plaines, Ill.
Continuation-in-part of application Ser. No. 767,312, Oct. 14, 1968. This application Dec. 21, 1970, Ser. No. 99,859
Int. Cl. C01b 17/06
U.S. Cl. 23—224        19 Claims

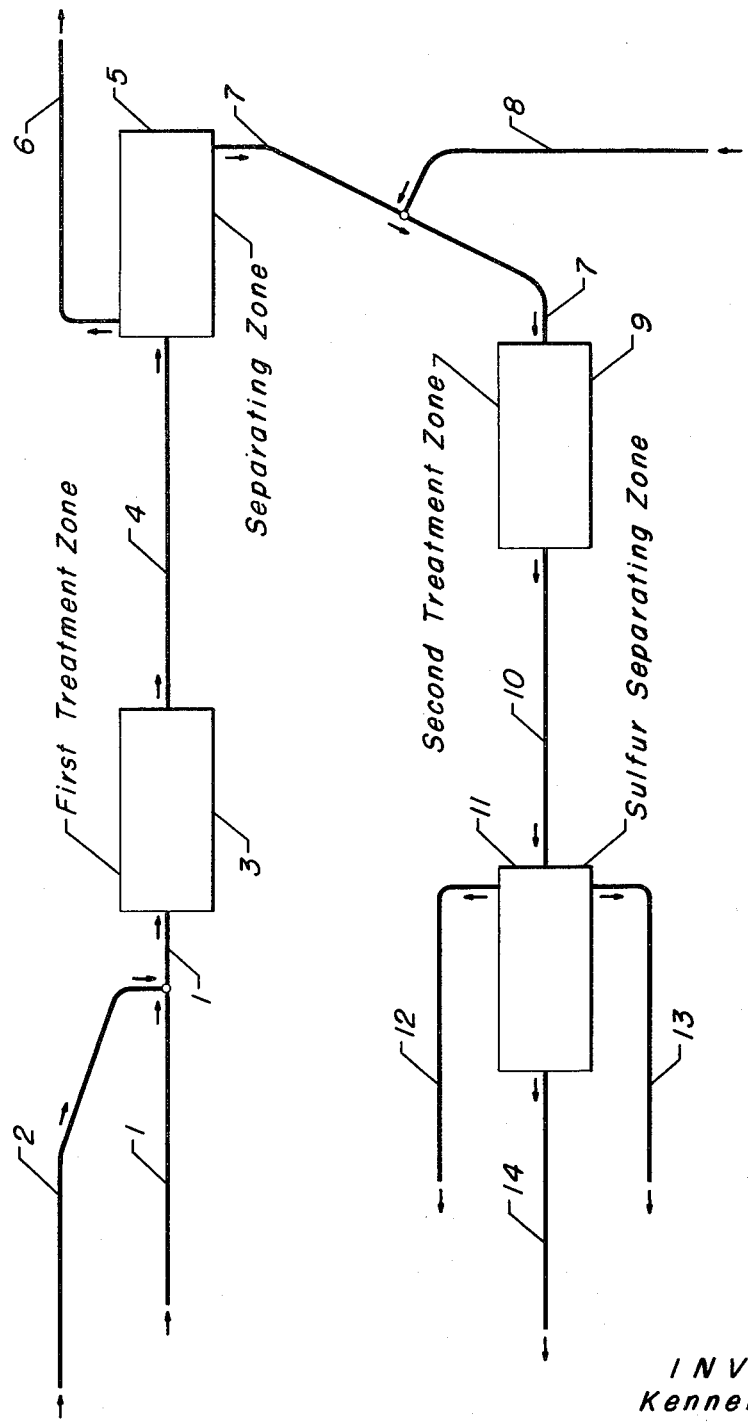

ABSTRACT OF THE DISCLOSURE

An aqueous stream containing a water-soluble, inorganic sulfide compound is treated by contacting the aqueous stream and oxygen, in an amount selected to react less than 0.5 mole of $O_2$ per mole of sulfide compound, with a first oxidizing catalyst at oxidizing conditions, including a relatively low pressure and temperature, selected to form an effluent stream containing a water-soluble polysulfide; and thereafter by contacting the polysulfide-containing effluent stream and oxygen in an amount less than the amount utilized in the first step, with a second oxidizing catalyst at oxidizing conditions, including a temperature greater than or equal to the melting point of sulfur and a pressure sufficient to maintain at least a portion of the effluent stream in the liquid phase, selected to produce liquid sulfur and a substantially sulfide-free treated water stream. Key features of the disclosed method involve the use of a first catalytic oxidation step which is run at relatively low temperatures and pressures to produce polysulfide, coupled with a second catalytic oxidation step which is run at relatively high temperatures and pressures to selectively oxidize the polysulfide to elemental sulfur, thereby preventing the deposition of elemental sulfur on the catalyst used during these oxidation steps while simultaneously minimizing the amount of oxygen which must be supplied at the relatively high pressures.

CROSS-REFERENCES TO RELATED APPLICATIONS

This application is a continuation-in-part of my prior, co-pending application Ser. No. 767,312 which was filed on Oct. 14 now abandoned.

DISCLOSURE

The subject of the present invention is a method for treating an aqueous stream containing a water-soluble inorganic sulfide compound in order to selectively recover elemental sulfur in liquid form while simultaneously minimizing the amount of high pressure oxygen which must be supplied to the method. More precisely, the present invention is directed at an efficient and economic solution to the deactivation problem that has heretofore plagued methods which employ a solid catalyst and oxygen in order to effect oxidation of water-soluble inorganic sulfide compounds to elemental sulfur. In brief, the deactivation problem essentially involves the deposition of elemental sulfur on the surface of the solid catalyst where it gradually blocks access of the reactants to the reactive sites of the catalytic surface and consequently deactivates the catalyst. The basic concept of the present invention follows from my recognition that one solution to this deactivation problem involves a catalytic oxidation procedure wherein conditions are selected so that liquid elemental sulfur is formed. Since liquid sulfur has a very low affinity for the oxidizing catalyst, it is easily separated therefrom, thereby obviating the catalyst deactivation problem. Coupled with this recognition was my finding that the conditions necessary to form liquid sulfur during this oxidation procedure involve a relatively high pressure. This in turn meant that the oxygen or air stream charged to this oxidation step had to be at a correspondingly high pressure, and this implies a requirement for a source of substantial amounts of high pressure oxygen or air. An exhaustive review of the economics of the resulting treatment method indicated that the largest operating cost item associated therewith was the cost of obtaining this high pressure oxygen or air stream. I have now found a two-step catalytic oxidation procedure wherein the first step is operated at a relatively low pressure and uses the major portion of the oxygen reactant and the second step is operated at the high pressure condition, thereby minimizing the requirement for high pressure oxygen or air and substantially improving the overall economics of this high pressure catalytic oxidation solution to the sulfur deactivation problem.

As part of the price that has to be paid for a modern industrial society large quantities of aqueous solutions of inorganic sulfide compounds are currently being produced, or could be produced from a number of diverse industrial sources. In particular, aqueous solutions containing sulfide salts are by-products of many economically significant industrial processes in the chemical, petroleum, steel, manufactured gas, natural gas, paper pulp, and the like industries. These aqueous solutions containing sulfide salts have in the past generally been regarded as waste water streams which are to be disposed of at the lowest possible cost. In many cases, this last requirement has dictated the discharge of these waste streams into sewer systems, or surrounding streams and/or lakes and bays. With the advent of growing public concern over the substantial water pollution problems thereby produced, this direct discharge of these streams is becoming less and less an acceptable alternative. In fact, because these streams contain sulfide salts which have a substantial chemical oxygen demand and cause substantial water pollution problems, a growing number of states are imposing stringent requirements on the discharge of this type of waste stream. In many situations where these waste streams are produced, it is, moreover, desired to recover a treated water stream which can be recycled to the industrial process from which the sulfide-containing water stream originally came in order to minimize the requirements for make-up water. For example, in the petroleum industry a water stream is typically utilized to remove ammonium hydrosulfide salts from the effluent equipment train associated with such hydrocarbon conversion processes as hydrorefining, hydrocracking, catalytic cracking, reforming, etc., wherein ammonia and hydrogen sulfide by-products are produced. The original purpose for injecting the water stream into these processes was to remove these detrimental ammonium hydrosulfide salts which can form in the heat transfer equipment that is utilized in these processes to cool the effluent stream from the hydrocarbon conversion step. These salts, if not removed from this equipment, accumulate therein and eventually restrict the passage of the effluent stream therethrough. The waste water stream so-formed presented a substantial pollution hazard insofar as it contains sulfide salts, which are toxic to oxidation promoting bacteria and have a substantial biochemical oxygen demand, and ammonia which is a nutrient that leads to excessive growth of marine organisms. Another example is encountered in many industrial processes where it is desired to remove hydrogen sulfide from a mixture of gases containing the same with a suitable scrubbing solution which generally is an aqueous alkaline solution or an aqueous ammoniacal solution. The scrubbing solution reacts with the hydrogen sulfide to produce sulfide salts, and the resulting solution must be either regenerated or disposed of. These last sulfide solutions are typical of those that can be treated by the method of the present invention in order to convert the sulfide contained therein into elemental sulfur, to minimize the biochemical oxygen demand of the resulting treated solution, and to prepare an essentially sulfide-free treated water stream which is suitable for reuse.

The water-soluble inorganic sulfide compound present in these aqueous streams is generally present as a salt of a common base such as ammonium sulfide or hydrosulfide; an alkali metal sulfide such as sodium sulfide or hydrosulfide, potassium sulfide or hydrosulfide; an alkaline earth metal sulfide such as calcium sulfide or hydrosulfide; and the like compounds. In this respect, it should be remembered that hydrogen sulfide because of its polar nature is soluble in aqueous solutions to some degree, even in the absence of an appropriate solubility increasing agent; for example, at 20° C. and 1 atmosphere pressure, 2.5 ml. of hydrogen sulfide will dissolve in 1 ml. of water. Thus hydrogen sulfide is a water-soluble inorganic sulfide compound.

Quite understandably, in recent years attention has been focused upon methods for converting these water-soluble sulfide compounds into forms which have less biochemical oxygen demand, and, if possible into a form which has substantial economical value, such as elemental sulfur. I have now found a multi-step method for treating these aqueous streams containing water-soluble sulfide compounds in order to selectively recover elemental sulfur. This method also uses a solid oxidizing catalyst and obviates the principal catalyst deactivation problem of the prior art, the problem of deposition of elemental sulfur on the surface of the oxidizing catalyst. Basically, my method involves a combination of two separate and distinct oxidation steps which are coupled together in order to minimize the requirements for high pressure oxygen or air while enabling the selective recovery of the elemental sulfur in liquid form. The first oxidation step utilizes low pressure oxygen or air in conjunction with a suitable oxidizing catalyst to effect production of an effluent stream containing a water-soluble polysulfide. Thereafter, the second oxidation step operates on this polysulfide-containing aqueous stream with high pressure oxygen or air and a second oxidizing catalyst to produce liquid sulfur and a treated aqueous stream. The concept of this two-step oxidation procedure evolved from my efforts directed at the solution of the sulfur contamination problem caused when a solid oxidizing catalyst is utilized in conjunction with a suitable oxygen stream to treat these sulfide-containing aqueous streams. As previously indicated, one solution to this sulfur deposition problem involves the operation of the oxidation step at conditions which result in the formation of liquid sulfur which has a low affinity for the catalyst and is easily separated therefrom, thereby eliminating the problem of sulfur deposition on the catalyst. However, as a result of my investigations, I have determined that the conditions required for this mode of operation are a temperature above the melting point of sulfur and a corresponding pressure sufficient to maintain the aqueous solution in the liquid phase. This pressure requirement necessarily in turn dictates a requirement for a high pressure oxygen or air source. An economic analysis of this liquid sulfur solution indicates that one of the substantial operating cost items associated with it is the cost of this high pressure oxygen or air. Accordingly, it is a principal advantage of the present invention that the amount of oxygen or air that has to be supplied at the relatively high pressure level is minimized via a first oxidation step which is operated at a relatively low pressure condition to form a water-soluble polysulfide. Another advantage is the production of a treated water stream which is substantially sulfide-free. Still another advantage is the high selectivity for elemental sulfur achieved thereby.

It is, accordingly, one object of my invention to provide a method for treating an aqueous stream containing a water-soluble inorganic sulfide compound in order to selectively produce elemental sulfur therefrom. A second object is to provide a method for treating an aqueous stream containing a water-soluble sulfide compound in order to reduce the biochemical oxygen demand associated therewith. A third object is to provide a convenient procedure to prevent deactivation by sulfur deposition on a solid catalyst employed in sulfide oxidation service. Another object is to minimize the requirements for high pressure oxygen or air in a method for treating an aqueous stream containing a water-soluble sulfide compound wherein a solid oxidizing catalyst is utilized in conjunction with an oxygen stream to produce elemental sulfur in the liquid state.

In brief summary, the present invention is in one embodiment, a method for treating an aqueous stream containing a water-soluble inorganic sulfide compound to selectively produce elemental sulfur and a substantially sulfide-free treated water stream. The first step of the method involves contacting the aqueous stream and oxygen with a first oxidizing catalyst at relatively mild oxidation conditions selected to form an effluent stream containing a water-soluble polysulfide compound. The amount of oxygen utilized in this first step is less than that required to react 0.5 mole of $O_2$ per mole of sulfide compound contained in the aqueous stream. The oxidation conditions utilized include a relatively low pressure, typically about 1 to about 30 p.s.i.g. and a relatively low temperature, typically about 75 to 200° F. In the second step of this method, the polysulfide-containing effluent stream formed in the first step and oxygen are contacted with a second oxidizing catalyst at relatively severe oxidation conditions selected to form liquid sulfur and a substantially sulfide-free treated aqueous stream. In this second step, the oxidation conditions utilized include a temperature greater than or equal to the melting point of sulfur and a pressure sufficient to maintain at least a portion of the effluent stream from the first step in the liquid phase. In addition, it is a feature of the instant method that the amount of oxygen utilized in this second step is less than the amount utilized in the first step.

In a second embodiment the method of the present invention involves a method as outlined above in the first embodiment wherein the first and second oxidizing catalyst comprise a metallic phthalocyanine combined with a porous carrier material. Typically, this metallic phthalocyanine is an iron group metallic phthalocyanine compound and the porous carrier material is alumina or an activated carbon carrier.

In another embodiment the method of the present invention involves a method as characterized above in the first embodiment wherein the water-soluble inorganic sulfide compound is ammonium sulfide or ammonium hydrosulfide.

In yet another embodiment the present invention is a method for treating an aqueous stream containing ammonium hydrosulfide in order to selectively produce elemental sulfur and a substantially sulfide-free treated water stream while minimizing the requirement for high pressure air. In this embodiment the first step involves contacting the aqueous stream and a first air stream with a first oxidizing catalyst, comprising a metallic phthalocyanine combined with a porous carrier material, at oxidation conditions, including a temperature of about 75 to about 200° F. and a pressure of about 1 to about 30 p.s.i.g., effective to form an effluent stream comprising nitrogen, ammonia, water and ammonium polysulfide. The first air stream is supplied to this step in an amount sufficient to react less than 0.5 mole of $O_2$ per mole of ammonium hydrosulfide contained in the input aqueous stream. In the second step, a gas stream containing nitrogen and minor amounts of ammonia is separated from the effluent stream from this first step to form an aqueous solution of ammonium polysulfide. The resulting aqueous solution of ammonium polysulfide is, in the next step, contacted with a second air stream in the presence of a second oxidizing catalyst, comprising a metallic phthalocyanine combined with a porous carrier material, at oxidation conditions, including a temperature of at least 235° F. and a pressure sufficient to maintain the aqueous solution in the liquid phase, effective to form an effluent stream comprising nitrogen, ammonia, liquid sulfur and a treated aqueous stream. The amount of this second air stream charged to this last step is less than the amount of the air charged to the first step. In the final step, liquid sulfur and a gas stream comprising nitrogen and minor amounts of ammonia are separated from this last effluent stream to form a treated water stream which is substantially free of ammonium hydrosulfide.

In still another embodiment, the method of the present invention is a method as last described above wherein the metallic phthalocyanine component of the first and second oxidizing catalyst is cobalt phthalocyanine monosulfonate, and wherein the porous carrier material utilized in these catalysts alumina or activated carbon.

Other objects and embodiments associated with the present invention are hereinafter disclosed in the following detailed discussion of input streams, preferred oxidizing catalysts, reaction conditions, output streams and the mechanics associated with each of the essential and preferred steps of the method of the present invention.

At this point, it is to be recognized that an essential feature of the present invention is the utilization of a two-step oxidation procedure. The first step is conducted at relatively mild conditions, thereby enabling the use of relatively low pressure oxygen or air. And the second step operates on the effluent stream from the first step to recover liquid sulfur and to complete the oxidation of the residual sulfide that is present in the effluent stream from the first step in the form of a water-soluble polysulfide. This method allows the first step to be operated at conditions which prevent the deposition of sulfur on the solid catalyst employed therein by virtue of the fact that the sulfur formed therein is soluble in the excess sulfide charged to this step. On the other hand, the problem of the deposition of sulfur is avoided in the second step by operating at conditions resulting in the formation of liquid sulfur which separates easily from the solid catalyst.

The aqueous stream containing a water-soluble sulfide compound that is the principal input stream to the first step may, as indicated hereinbefore, be produced in one or more of the number of industrial processes that are faced with a water disposal problem of this kind. Typically, the water-soluble inorganic sulfide compound present in this stream will be selected from one or more of the following classes: (1) hydrogen sulfide; (2) ammonium sulfide or hydrosulfide; (3) alkali metal sulfides or hydrosulfides such as sodium sulfide or hydrosulfide, potassium sulfide or hydrosulfide, etc.; (4) alkaline earth metal sulfides or hydrosulfides such as the sulfides or hydrosulfides of calcium, strontium, or barium and the like compounds. Similarly, the amount of the sulfide compound present in these aqueous streams may vary over a wide range up to the solubility limit of the particular salt in water at the conditions utilized in the first step. Typically, the amount of the water-soluble sulfide compound contained in the waste stream charged to the first step is about 0.1 to about 20 wt. percent calculated as equivalent sulfur of this stream. For example a typical water stream from a hydrocracking plant contains about 6 wt. percent sulfur as $NH_4HS$. In general, the method of the present invention gives excellent results when the aqueous stream charged thereto contains ammonium hydrosulfide. Furthermore, the aqueous stream may contain one or more components or buffering agents which enhance the solubility of the particular sulfide compound in water or which serve to adjust the pH of the resulting solution to a preferred value of about 7 to about 10.5; examples of these are: metal salts of weak acids such as alkali metal carbonates, alkali metal phosphates, etc.; organic bases such as methylamine, ethylamine, ethanolamine etc.; and others well known in the art.

An essential reactant for the method of the present invention is oxygen. This may be utilized in any suitable form either by itself or mixed with other relatively inert gases. In general, because of economic factors, it is preferred to utilize air streams as the source for the necessary oxygen in both oxidation steps of the present invention. The amounts of oxygen utilized in the two oxidation steps of the present invention are discussed hereinafter.

The catalyst utilized in the oxidation steps of the present invention can generally be any suitable oxidizing catalyst that is capable of effecting substantially complete conversion of the water-soluble sulfide compound contained in the input aqueous stream. Two particularly preferred classes of catalysts for these oxidation steps are metallic sulfides, particularly iron group metallic sulfides, and metal phthalocyanines. This metallic sulfide catalyst is preferably an iron group metallic sulfide, that is the sulfides of nickel, cobalt and iron, with nickel sulfide being especially preferred. Although it is possible to perform the oxidation steps of the present invention with a slurry of the metallic sulfide, it is preferred that a catalytically effective amount of the metallic sulfide be combined with a suitable carrier material. Examples of suitable carrier materials are: charcoal, such as wood charcoal, bone charcoal, etc. which may or may not be activated prior to use; either naturally occurring or synthetically prepared refractory inorganic oxides such as alumina, silica, zirconia, kieselguhr, bauxite, and the like highly porous inorganic carrier materials; and activated carbons such as those commercially available under trade names of Norit, Nuchar, Darco, and other similar activated carbon carrier materials familiar to those skilled in the art. The preferred carrier materials are alumina, particularly gamma or eta alumina, and activated carbon. Thus examples of especially preferred catalysts for use in the oxidation steps of the present invention are nickel sulfide combined with activated carbon. Any suitable means of combining the metallic component with the carrier material may be used such as impregnating it by immersing it in a solution of a soluble salt of the desired metallic component. Thereafter, the metallic component can be converted to the sulfide by treatment with hydrogen sulfide, preferably at room temperature or utilized as such in the method of the present invention with the conversion to the sulfide being effected during an initial part of the processing period. In some cases, it may be advantageous to calcine the impregnated carrier material prior to sulfiding it. In general, for this class of catalyst, the amount by weight of the metallic component may range up to about 60 wt. percent or more of the total composite. It is generally preferred, however, to operate in the range of about 1 to about 25 wt. percent of the total composite. For example, one preferred catalyst for use in the oxidation step is a composite of nickel sulfide with gamma-alumina containing about 12 wt. percent nickel as nickel sulfide.

The other preferred class of oxidizing catalysts for use in the oxidation steps comprise metallic phthalocyanine compound combined with a suitable porous carrier material. Particularly preferred metal phthalocyanine compounds include those of the iron group metals and vanadium. Other metal phthalocyanine compounds that may be utilized include those of copper, molybdenum, manganese, tungsten, etc. Best results are ordinarily obtained when the metal phthalocyanine is a cobalt phthalocyanine compound. Moreover, any suitable derivative of the metal phthalocyanine may be employed including the sulfonated derivatives and the carboxylated derivatives, with the monosulfonated derivative being particularly preferred. In general, the metallic phthalocyanine compound is preferably utilized as a composite with a suitable adsorptive carrier material such as the ones enumerated above, and the preferred carrier material is activated carbon. The amount of the phthalocyanine compound combined with the carrier material may be any amount which is catalytically effective. However, because of the high activity of the metal phthalocyanine catalyst good results are ordinarily obtained when it comprises about 0.1 to about 5% of the composite, with best results obtained when it comprises about 0.1 to about 2 wt. percent of the composite. Additional details as to alternative carrier materials, methods of preparation, preferred amounts of catalytic components, etc. are given in the teachings of U.S. Pat. No. 3,108,081 for these metallic phthalocyanine catalysts.

Although both oxidation steps can be performed according to any of the methods taught in the art for contacting a liquid stream and a gas stream with a solid catalyst, the preferred system involves a fixed bed of the solid oxidizing catalyst disposed in a treatment zone. The aqueous input stream is then passed therethrough in either upward, radial, or downward flow and the oxygen or air stream is passed thereto in either concurrent flow relative to aqueous waste stream. The preferred mode is downflow and concurrent flow for both oxidizing steps.

According to the present invention, the first oxidation step involves contacting, in a first treatment zone, the aqueous input stream and oxygen with a first bed of oxidizing catalyst of the type hereinabove described at relatively mild oxidizing conditions. The conditions utilized in this first step include a temperature of about 75 to about 200° F., and preferably about 100 to about 175° F.; a pressure of about 1 to about 30 p.s.i.g. and preferably about 1 to about 20 p.s.i.g.; and a liquid hourly space velocity (defined to be the volume rate per hour of charging the aqueous waste stream divided by the total volume of the catalyst bed) selected from the range of about 0.5 to about 10 hrs.$^{-1}$, with a preferred value being about 1 to about 3 hrs.$^{-1}$. It is a feature of the present invention that the first step is operated at a mole ratio of oxygen to the water-soluble sulfide compound contained in the aqueous stream selected to react less than 0.5 mole of $O_2$ per mole of said sulfide compound, with a preferred value being about 0.3 to 0.45 mole of $O_2$ per mole of said sulfide compound. This limitation on the amount of oxygen supplied to the first step insures that the amount of oxygen supplied is less than the amount required to oxidize all the sulfide compound to elemental sulfur. Accordingly, as is explained in U.S. Pat. No. 3,457,046, a water-soluble polysulfide is obtained in this first oxidation step by a reaction between the excess sulfide and the sulfur product of the oxidation reaction. In view of the high solubility of elemental sulfur in a sulfide solution, operating in this fashion insures that sulfur deposition will not deactivate the catalyst employed in this first step.

Following the first oxidation step an effluent stream is withdrawn therefrom containing a water-soluble polysulfide. In the preferred case where an air stream is utilized to supply the necessary oxygen to this first step, this effluent stream will also contain the inert nitrogen that was present in this air stream. This nitrogen is then easily separated from this aqueous stream containing a polysulfide in any suitable separating zone. This may, if desired, be accomplished within the first treatment zone by a suitable baffling arrangment.

The second oxidation step operates on this aqueous stream containing a water-soluble polysulfide recovered from the effluent from the first oxidation step. In accordance with the present invention, this aqueous stream and a second oxygen or air stream is contacted, in a second treatment zone, with a second oxidizing catalyst of the type hereinabove described, at relatively more severe oxidizing conditions. It is, of course, understood that the catalyst utilized in this second oxidation step may be different from that utilized in the first oxidation step; nevertheless, I have found it to be preferable to operate both of these steps with the same kind of catalyst. For example, a preferred mode of operation is to use a catalyst comprising cobalt phthalocyanine monosulfonate combined with an activated carbon carrier material in both the first and the second oxidation step.

The conditions utilized in this second oxidation step are generally characterized as relatively more severe than those utilized in the first oxidation step and include: (1) a temperature greater than or equal to the melting point of sulfur, that is a temperature of at least 235° F., and more typically about 235° F. to about 325° F., with best results obtained at a temperature of about 235 to about 265° F.; (2) a pressure sufficient to maintain at least a portion of the aqueous stream charged to this second step in the liquid phase, although it is distinctly preferred to utilize a pressure which is quite close to this minimum pressure; thus a preferred pressure is selected from the range corresponding to about 1 to 1.5 times the minimum pressure required to maintain water in the liquid phase at the specific temperature utilized in this step, with an especially preferred pressure being a pressure just sufficient to maintain a portion of the solution charged to this step in the liquid phase; and (3) a liquid hourly space velocity in the range of about 0.5 to about 10 hrs.$^{-1}$. For example, excellent resuts are obtained in this step at conditions including an inlet reactor temperature of about 235 to about 265° F. and a reactor pressure of about 20 to about 40 p.s.i.g.

It is a feature of the present invention that the amount of oxygen utilized in this second oxidation step to selectively oxidize the polysulfide to elemental sulfur, is an amount less than the amount utilized in the first oxidation step. The amount of oxygen required in this second oxidation step is not greater than 80% of the stoichiometric amount required to completely oxidize all the sulfide contained in the aqueous stream charged to the first step to sulfur and typically, much less than this. Accordingly, of the total amount of oxygen utilized in the present method, typically about ½ to about ¾ or more will be supplied at the low pressure and about ½ to about ¼ or less at the high pressure, thus minimizing the requirements for air or oxygen for the second oxidation step.

Following the second oxidation step, an effluent stream is withdrawn therefrom. This second effluent stream typically comprises a mixture of liquid sulfur and a treated aqueous stream which is substantially free of the water-soluble sulfide compound originally present in the input aqueous stream. In addition, it will typically contain minor amounts of other higher oxides of sulfur which are produced as side products of the principal oxidation reaction of sulfide to sulfur. These side products are generally the corresponding sulfite, thiosulfate, and sulfate salts, with the thiosulfate salt typically being the major side product. The liquid sulfur separates readily from the treated aqueous stream in any suitable conventional settling means. In fact, the separation of the liquid sulfur from the treated aqueous stream can be easily accomplished within the second treatment zone by allowing a liquid sulfur phase to form at the bottom of this zone and separately drawing off the treated aqueous stream and a liquid sulfur stream. Once again, it is understood that in the preferred mode where the oxygen is supplied to this second step via an air stream, the effluent stream withdrawn from the second step will contain a minor amount of inert nitrogen which is easily separated therefrom in a suitable gas separating means.

Having broadly characterized the essential steps comprising the method of the present invention, reference is now made to the attached drawing for a detailed explanation of an example of a preferred flow scheme employed therewith. The attached drawing is merely intended as a general representation of the flow scheme employed with no intent to give details about heaters, condensers, pumps, compressors, valves, process control equipment, etc., except where a knowledge of these elementary devices is essential to the understanding of the present invention or would not be self-evident to one skilled in the art. In addition, in order to provide a working example of a preferred mode of the present invention, the attached drawing is discussed with reference to a particularly preferred mode of operation of each of the steps of the present invention and preferred catalyst for use in these steps.

A catalyst comprising cobalt phthalocyanine monosulfonate combined with activated carbon is prepared by dissolving cobalt phthalocyanine monosulfonate in methanol. Activated carbon granules of 30–40 mesh (U.S. standard series) are added to the solution with stirring. The mixture is allowed to stand and then filtered to remove excess alcohol. The resulting catalyst is then dried and is found to contain 0.5 wt. percent of the phthalocyanine compound. This catalyst is then divided into two equal portions which are then placed in the first and second treatment zones shown on the attached drawing. The catalysts are maintained within the respective zones as a supported fixed bed.

Referring now to the attached drawing, an aqueous stream enters the system via line 1. This aqueous waste stream contains ammonium hydrosulfide in an amount of about 5.5 wt. percent sulfur as $NH_4HS$. At the junction of line 2 with line 1 this aqueous stream is admixed with a first air stream in an amount sufficient to provide 0.4 mole of $O_2$ per mole of $NH_4HS$ contained in this aqueous stream. The resulting mixture is then heated by a conventional heating means to a temperature of about 125° F. and charged to a first treatment zone, zone 3, wherein the resulting mixture is passed into contact with the bed of solid oxidizing catalyst in downflow fashion. The conditions utilized in zone 3 are a temperature of about 125° F. at the inlet to the zone and a temperature of about 150° F. at the outlet of the treatment zone. The temperature rise across the zone is caused, of course, by the exothermic reaction taking place therein. Treatment zone 3 is maintained at a pressure of 5 p.s.i.g., and the aqueous waste stream enters therein at a rate corresponding to a LHSV of 1 hr.$^{-1}$. Because of side reactions, a minor amount of the sulfide contained in the waste stream is oxidized to higher oxides of sulfur—principally $(NH_4)_2S_2O_3$. The amount of these higher oxides produced within zone 3 corresponds to about 1 to about 10% or more of the sulfide charged thereto, depending upon the conditions utilized. The amount of oxygen supplied to treatment zone 3 is less than the stoichiometric amount necessary to convert the sulfide to sulfur; consequently, there is essentially no problem with sulfur depositing on and deactivating the catalyst bed maintained therein, because elemental sulfur reacts with the excess sulfide to form the water-soluble ammonium polysulfide. Accordingly, the effluent stream withdrawn from zone 3 via line 4 contains ammonium polysulfide, $NH_4OH$, $(NH_4)_2S_2O_3$, and a minor amount of nitrogen gas containing some of the ammonia released from combination with the sulfide ion. Analysis indicates about 70% of the sulfide charged to zone 3 is converted therein.

The effluent stream from zone 3 is charged to separating zone 5 via line 4 wherein a gas phase separates from a liquid phase. The gas phase comprises mainly nitrogen and ammonia and is withdrawn via line 6. In some cases, it is advantageous to perform the separation of this gas phase in the lower regions of the first treatment zone by methods well known by those skilled in the art.

Regardless of how the nitrogen gas is separated, an aqueous stream containing ammonium polysulfide and a minor amount of higher oxides of sulfur is withdrawn from separating zone 5 via line 7. An analysis of this stream shows it to contain about 1.76 wt. percent sulfur as sulfide, about 3.5 wt. percent combined sulfur (that is, combined with this sulfide in the form of a polysulfide), and about .24 wt. percent sulfur as higher oxides of sulfur, principally ammonium thiosulfate. This aqueous stream is then commingled with a second air stream at the junction of line 8 with line 7. This second air stream is supplied at a rate sufficient to provide about 0.8 mole of oxygen per mole of sulfide remaining in this aqueous solution. This is equivalent to about 60% of the amount of air supplied to the first oxidation step. The resulting mixture of air and polysulfide-containing stream is then heated by a suitable heating means to a temperature of about 250° F. and charged to second treatment zone 9 wherein it is contacted with the second bed of the solid oxidizing catalyst in downflow fashion. A pressure of about 30 p.s.i.g. is maintained within treatmetn zone 9 in order to hold the aqueous stream in liquid phase. Moreover, a LHSV of about 1 hr.$^{-1}$ is utilized. In zone 9 the oxygen reacts with the ammonium polysulfide to liberate liquid sulfur therefrom and to oxidize the remaining portion of sulfide primarily to elemental sulfur. A minor portion of the sulfide is oxidized to higher oxides of sulfur, once again principally ammonium thiosulfate.

An effluent stream comprising nitrogen, ammonia, and a dispersion of liquid sulfur in a treated aqueous stream is withdrawn from zone 9 via line 10. The resulting mixture is charged to sulfur separation zone 11 wherein a liquid sulfur phase is allowed to separate from the aqueous stream. A gas stream containing nitrogen and ammonia is also separated and vented from the system via line 12. The liquid sulfur is recovered via line 13 and the treated aqueous stream is withdrawn from this system via line 14. An analysis of the treated aqueous stream shows it to contain only about 0.2 wt. percent sulfur as ammonium hydrosulfide and about 0.5 wt. percent sulfur as ammonium thiosulfate. Accordingly, about 85% of the sulfide sulfur originally present in the aqueous stream entering the system via line 1 is recovered as elemental sulfur via line 13. Moreover, the beds of catalyst employed in the first and second treatment zones are not deactivated by the deposition of elemental sulfur thereon; in fact, their performance is very stable. In view of the fact that about 62% of the total amount of oxygen utilized is supplied at low pressure of 5 p.s.i.g., and only about 38% at the high pressure of 30 p.s.i.g., a substantial savings is realized in the cost of compressing an air stream to the higher pressure level. In addition, a treated aqueous stream withdrawn via line 14 has a greatly reduced biochemical oxygen demand as contrasted with the aqueous stream originally charged to the system; accordingly, after stripping at least a portion of the ammonia from this stream, it can in many cases be reused in the process from which it originated, or can be safely discharged into a suitable sewer. Moreover, since this treated water stream is substantially free of sulfide, a sulfide-free ammonia-rich gas stream is easily recovered therefrom by a conventional stripping procedure, thereby avoiding the problem of purifying a sulfide-contaminated ammonia stream such as is produced in many of the prior art procedures for treating $NH_4HS$-containing water streams.

EXAMPLE I

A comparison study was made between the two-step oxidation procedure of the present invention and a single step oxidation procedure in order to clearly demonstrate the substantial advantages associated with the present invention.

In both of the following runs the same oxidizing catalyst was utilized. It was a combination of 1 wt. percent of cobalt phthalocyanine monosulfonate with a carbonaceous carrier material. The carrier material was 12 to 30 mesh (U.S. standard sieve series) particles of Nuchar WA activated carbon having an apparent bulk density of 0.15 g./cc.

The feed stream utilized in both cases was an aqueous solution containing 5.6 wt. percent sulfur in the form of ammonium hydrosulfide.

In the first run, the single stage oxidation run, the feed stream was admixed with an oxygen stream and passed into a single reaction zone containing a fixed bed of the catalyst. The amount of oxygen charged to the reaction zone was approximately twice the stoichiometric amount necessary to oxidize all of the sulfide in the feed stream to elemental sulfur; that is, one mole of oxygen per atom of sulfide sulfur. By means of conventional techniques, the mixture of the air and water streams was heated to an inlet reactor temperature of 302° F. During the run, the outlet temperature from the reaction zone was at 314° F. The reaction zone was operated at a pressure of 90 p.s.i.g. and a LHSV of 1.5 hrs.$^{-1}$. The reaction zone was, moreover, operated in a concurrent flow manner with the reactants being passed over the catalyst in a downflow fashion.

An effluent stream comprising a mixture of liquid sulfur and an aqueous product stream was withdrawn from the lower region of the reaction zone and subjected to an analysis to determine yield of oxysulfur compounds and elemental sulfur. Results of the analysis showed that 100% of the sulfide charged to the reactor was converted therein, 52.5% of the sulfide charged was converted to elemental sulfur and 47.5% of the sulfide charged was converted to undesired, water-soluble oxysulfur compounds (primarily ammonium thiosulfate).

In the second run, the run according to the two-step method of the present invention, two separate reaction zones were loaded with equal amounts of the oxidizing catalyst. The first reaction zone was operated with a stoichiometrically insufficient amount of air to oxidize all of the sulfide to elemental sulfur; specifically, it was operated at a mole ratio of oxygen to sulfide sulfur of 0.37:1. The feed stream and the oxygen stream were admixed, heated by conventional means to a temperature of 140° F. and passed in downflow fashion into the first reactor containing the oxidizing catalyst. This reactor was operated at a pressure of 5 p.s.i.g., and a LHSV of 2 hrs.$^{-1}$. An effluent stream was then withdrawn from the lower region of this first reactor and found to be at a temperature of 183° F. An analysis of this effluent stream showed that it contained ammonium polysulfide, ammonium thiosulfate, and minor amounts of unreacted ammonium hydrosulfide. The relative quantities of these constituents indicated that 68% of the sulfide charged to the reactor was converted therein with 94% of the converted sulfide going to elemental sulfur and 6% going to ammonium thiosulfate. This elemental sulfur, of course, was bound up with the sulfide to form the ammonium polysulfide.

The aqueous portion of the effluent stream from this first reactor was then admixed with an additional amount of oxygen and charged to a second reactor containing another portion of the oxidizing catalyst. The amount of oxygen charged to this second reaction zone was sufficient to provide two times the stoichiometric amount necessary to oxidize the remaining sulfide in this effluent stream to elemental sulfur; this amount was 1 mole of oxygen per mole of sulfide remaining in the effluent stream. The second reaction zone was operated at an inlet temperature of 302° F. and an outlet temperature of 314° F., a pressure of 90 p.s.i.g. and a LHSV of 3 hrs.$^{-1}$. An effluent stream containing liquid sulfur admixed with a treated aqueous stream was then withdrawn from the lower region of this second reaction zone. An analysis of this last stream indicated that 100% of the sulfide charged to this zone was converted therein. In addition, an analysis of the products from the second reactor showed that 67% of the charged sulfide was converted into this two-step operation to elemental sulfur and 33% was converted to undesired oxysulfur compounds, primarily ammonium thiosulfate.

Although the second run was performed at less than optimum conditions for recovery of elemental sulfur (these optimum conditions were previously discussed) the method of the present invention still enabled a significant improvement in the selectivity for elemental sulfur, changing it from 52.5% to 67%. Moreover, the first run required one mole of oxygen per atom of sulfide oxidized whereas the second run was operated with 0.7 mole of oxygen per atom of sulfide. More significantly, 55% of the oxygen required for the second run was delivered at low pressure in contrast to the requirement of the first run for all oxygen at the relatively high pressure level. Since a significant portion of the operating costs of this type of process for the cost of compressing the oxygen to the relatively high pressure level, the economic advantages of the present invention are evident.

EXAMPLE II

The catalyst utilized was a combination of 2.4 wt. percent of cobalt phthalocyanine monosulfonate with 12 to 30 mesh particles of Darco activated carbon. The feed stream was an aqueous solution containing 5.5 wt. percent sulfur in the form of ammonium hydrosulfide. The experiment was performed in a two reactor system which was identical to the one described in the second run of Example I.

The first reactor in this case was run at an inlet temperature of 160° F., a pressure of 5 p.s.i.g., a LHSV of 1 hr.$^{-1}$ and an oxygen to sulfide mole ratio of 0.375:1. The aqueous effluent stream withdrawn from the first reactor contained 1.49 wt. percent sulfur bound up in ammonium polysulfide and 0.25 wt. percent of sulfur as ammonium thiosulfate. The conversion of sulfide in the first reactor was 63%.

The second reactor was operated at an inlet temperature of 266 to 284° F., a pressure of 30 p.s.i.g., and a LHSV of 1.5 hrs.$^{-1}$. The amount of oxygen charged to this second reactor was set at a value corresponding to a mole ratio of oxygen to sulfide of 0.6:1.

Results of an analysis of the aqueous effluent stream withdrawn from the second reactor showed that 92% of the sulfide charged to the second reactor was oxidized therein and 24% of the converted sulfide went to ammonium thiosulfate and 76% of the converted sulfide went to elemental sulfur. In addition, the aqueous effluent stream withdrawn from the second zone was substantially free of sulfide, containing only about 1200 p.p.m. of same. Yield calculation on an overall basis indicated that 96% of the sulfide charged to this two reactor system was converted therein at a selectivity for elemental sulfur of 90%. Moreover, the total amount of air charged to the system was 110% of the stoichiometric amount necessary to oxidize all of the sulfide in the feed stream to elemental sulfur, with 70% of the oxygen requirement being low pressure oxygen supplied to the first reactor and only 30% of this oxygen requirement being supplied to the second reactor.

This example demonstrates the capability of the method of the present invention to selectively produce elemental sulfur, minimize undesired oxysulfur by-products, produce a treated water stream which is substantially free of sulfide, and minimize the requirement for high pressure oxygen or air. This example also illustrates, when contrasted with the results of the second run of the first example, the significant shift in selectivity for elemental sulfur that is enabled by reducing the pressure and temperature of the second reactor.

EXAMPLE III

The catalyst was a combination of 2.4 wt. percent cobalt phthalocyanine monosulfonate with 10 to 30 mesh particles of Darco activated carbon. It was loaded into a two reactor system which was identical to that described for the second run in Example I. The feed stream utilized was an aqueous solution of ammonium hydrosulfide in an amount such that the solution contained 11 wt. percent sulfur. This catalyst and feed stream were then utilized in an experiment with two reactor systems which was quite similar to that reported above in Example II.

The first reactor was run at an inlet temperature of 160° F., a pressure of 5 p.s.i.g., a LHSV of 1 hr.$^{-1}$ and an oxygen to sulfide ratio of 0.375:1. Results of this first reactor operation show 67% of the sulfide being converted therein with 95% of the converted sulfide going to elemental sulfur bound up in the form of ammonium polysulfide.

The second reactor was operated at an inlet temperature of 248° F., a pressure of 30 p.s.i.g., a LHSV of 1 hr.$^{-1}$ and an oxygen to sulfide ratio of 0.8:1. An analysis of the products withdrawn from the second reactor indicated that 78% of the oxygen charged to this reactor was converted therein and 92% of the sulfide charged was also converted therein. In addition, the selectivity for elemental sulfur observed on an overall basis was 92% of the sulfide charged to the first reactor. The amount of oxygen utilized was 128% of the stoichiometric amount necessary to oxidize all of the sulfide in the feed stream to elemental sulfur, with 60% of this amount being charged to the first reactor at the low pressure of 5 p.s.i.g.

This example illustrates the benefits associated with the present invention in an embodiment where the feed stream charged to the method is relatively rich in sulfide.

It is intended to cover by the following claims all changes and modifications of the above disclosure of the present invention which would be self-evident to a man of ordinary skill in the water-treating art.

I claim as my invention:

1. A method for treating an aqueous stream containing a water-soluble, inorganic sulfide compound, said method comprising the steps of:
    (a) contacting said aqueous stream and oxygen, in an amount sufficient to react less than 0.5 mole of $O_2$ per mole of said sulfide compound, with a first oxidizing catalyst at oxidation conditions, including a relatively low pressure and temperature, selected to form an effluent stream containing a water-soluble polysulfide; and thereafter,
    (b) contacting the polysulfide-containing effluent stream and oxygen, in an amount less than the amount utilized in step (a), with a second oxidizing catalyst at oxidation conditions, including a temperature greater than or equal to the melting point of sulfur and a pressure sufficient to maintain at least a portion of the effluent stream in the liquid phase, selected to form liquid sulfur and a substantially sulfide-free treated aqueous stream.

2. A method as defined in claim 1 wherein said sulfide compound is ammonium sulfide or ammonium hydrosulfide.

3. A method as defined in claim 1 wherein said sulfide compound is an alkali metal sulfide or an alkali metal hydrosulfide.

4. A method as defined in claim 1 wherein said sulfide compound is an alkaline earth metal sulfide or an alkaline earth metal hydrosulfide.

5. A method as defined in claim 1 wherein said first and second oxidizing catalysts comprise a metallic phthalocyanine combined with a porous carrier material.

6. A method as defined in claim 5 wherein said metallic phthalocyanine is an iron group metal phthalocyanine.

7. A method as defined in claim 6 wherein said iron group metal phthalocyanine is cobalt phthalocyanine monosulfonate.

8. A method as defined in claim 1 wherein said first and second oxidizing catalysts comprise an iron group metallic sulfide combined with a porous carrier material.

9. A method as defined in claim 8 wherein said iron group metallic sulfide is nickel sulfide.

10. A method as defined in claim 8 wherein said porous carrier material is alumina or activated carbon.

11. A method as defined in claim 1 wherein said oxidation conditions utilized in step (a) include a temperature of about 75 to about 200° F. and a pressure of about 1 to about 30 p.s.i.g.

12. A method as defined in claim 1 wherein the temperature utilized in step (b) is about 235 to about 325° F.

13. A method as defined in claim 1 wherein the pressure utilized in step (b) is about 1 to about 1.5 times the minimum pressure required to hold water in the liquid phase at the specific temperature utilized.

14. A method as defined in claim 1 wherein the pressure utilized in step (b) is just sufficient to maintain at least a portion of the effluent stream in the liquid phase.

15. A method as defined in claim 1 wherein the oxidation conditions utilized in step (a) are a temperature of about 100 to about 175° F. and a pressure of about 1 to about 20 p.s.i.g.

16. A method as defined in claim 1 wherein the conditions utilized in step (b) are a temperature of about 235 to about 265° and a pressure of about 20 to about 40 p.s.i.g.

17. A method for treating an aqueous stream containing $NH_4HS$, said method comprising the steps of:
    (a) contacting the aqueous stream and a first air stream with a first oxidizing catalyst, comprising a metallic phthalocyanine combined with a porous carrier material, at oxidation conditions, including a temperature of about 75 to about 200° F. and a pressure of about 1 to about 30 p.s.i.g., effective to form an effluent stream comprising nitrogen, ammonia, water and ammonium polysulfide, said first air stream being supplied in an amount sufficient to react less than 0.5 mole of $O_2$ per mole of $NH_4HS$ contained in the aqueous stream;
    (b) separating a gas stream containing nitrogen and ammonia from the effluent stream to form an aqueous solution of ammonium polysulfide;
    (c) contacting the polysulfide-containing aqueous solution and a second air stream with a second oxidizing catalyst comprising a metallic phthalocyanine combined with a porous carrier material, at oxidation conditions including a temperature of at least 235° F. and a pressure sufficient to maintain the aqueous solution in the liquid phase, effective to form an effluent stream comprising nitrogen, ammonia, liquid sulfur and a treated aqueous stream, said second air stream being supplied in an amount less than the amount of air charged to step (a); and
    (d) separating nitrogen, ammonia, and liquid sulfur from the effluent stream from step (c) to form a treated aqueous stream which is substantially free of $NH_4HS$.

18. A method as defined in claim 17 wherein the metallic phthalocyanine utilized in the first and second oxidizing catalysts is cobalt phthalocyanine monosulfonate.

19. A method as defined in claim 17 wherein the porous carrier material utilized in the first and second oxidizing catalyst is alumina or activated carbon.

References Cited
UNITED STATES PATENTS

| | | | |
|---|---|---|---|
| 1,656,563 | 1/1928 | Koppe | 23—224 |
| 3,034,865 | 5/1962 | Urban | 23—225 |
| 3,457,046 | 7/1969 | Hoekstra | 23—224 |

OSCAR R. VERTIZ, Primary Examiner

G. O. PETERS, Assistant Examiner

U.S. Cl. X.R.

210—63